(12) United States Patent
Buchholz et al.

(10) Patent No.: US 12,304,128 B2
(45) Date of Patent: May 20, 2025

(54) PELLETIZER

(71) Applicant: Maag Germany GmbH, Großostheim (DE)

(72) Inventors: Dominik Buchholz, Straelen (DE); Michael Eloo, Xanten (DE); Patrick Sladky, Geldern (DE); Jürgen Veltel, Kevelaer (DE)

(73) Assignee: MAAG Germany GmbH, Grossostheim (DE)

( * ) Notice: Subject to any disclaimer, the term of this patent is extended or adjusted under 35 U.S.C. 154(b) by 159 days.

(21) Appl. No.: 18/219,075

(22) Filed: Jul. 6, 2023

(65) Prior Publication Data
US 2024/0009907 A1   Jan. 11, 2024

(30) Foreign Application Priority Data

Jul. 7, 2022   (DE) .......................... 102022117002.0

(51) Int. Cl.
*B29C 48/00* (2019.01)
*B29C 48/345* (2019.01)
*B29B 9/06* (2006.01)

(52) U.S. Cl.
CPC ........ *B29C 48/0022* (2019.02); *B29C 48/345* (2019.02); *B29B 9/06* (2013.01)

(58) Field of Classification Search
CPC ....... B29C 48/345; B29C 48/92; B29C 48/05; B29C 48/0022; B29C 48/2528; B29C 48/04; B29C 48/919; B29C 48/362; B29C 48/1472; B29C 2948/9259; B29C 2948/92971; B29C 2948/92961; B29C 2948/926; B29B 9/06; B29B 9/065
See application file for complete search history.

(56) References Cited

U.S. PATENT DOCUMENTS

| 4,728,276 A | 3/1988 | Pauley et al. |
| 7,007,559 B2 | 3/2006 | Klammer et al. |
| 2010/0033021 A1 | 12/2010 | Hurt et al. |

(Continued)

FOREIGN PATENT DOCUMENTS

| DE | 1964413 A1 | 7/1971 |
| DE | 19647396 C2 | 5/1998 |

(Continued)

OTHER PUBLICATIONS

Office Action from Japanese Application No. JP2023-110246 dated Nov. 12, 2024.

(Continued)

*Primary Examiner* — Thu Khanh T. Nguyen
(74) *Attorney, Agent, or Firm* — Troutman Pepper Locke LLP; Ryan A. Schneider; Korbin M. Blunck (57) ABSTRACT

A pelletizer with a rotatably drivable cutter head for dividing material strands output from a die plate into pellets, the cutter head being drivingly connected to a drive motor via a drive shaft, and with a feed device for axial adjustment of the cutter head relative to the die plate in the direction of the cutter head axis of rotation. A spindle element of a spindle drive stage of the feed device is configured as a spindle sleeve which is axially firmly seated on the rotating drive shaft between the drive motor and the cutter head. The drive shaft is connected to the cutter head in an axially-fixed and rotationally-fixed manner and transmits the axial movement of the spindle sleeve to the cutter head.

25 Claims, 3 Drawing Sheets

(56) References Cited

U.S. PATENT DOCUMENTS

2010/0330216 A1 12/2010 Hurt et al.
2014/0284833 A1 9/2014 Hurt et al.

FOREIGN PATENT DOCUMENTS

| DE | 29624638 U1 | 3/2006 |
|---|---|---|
| EP | 1286811 B1 | 3/2003 |
| EP | 2067591 A1 | 6/2009 |
| EP | 2442954 B1 | 5/2017 |
| JP | H06-297451 A | 10/1994 |
| JP | H0752152 A | 2/1995 |
| JP | 2004-537437 A | 12/2004 |
| JP | 2012-530622 A | 12/2012 |
| WO | 0194088 A2 | 12/2001 |
| WO | 02/100621 A2 | 12/2002 |
| WO | 2020/107050 A1 | 6/2020 |

OTHER PUBLICATIONS

Extended European Search Report from EU Application No. 23179968.5 dated Oct. 18, 2023.
Search Report from German Application No. 10 2022 117 002.0 dated Nov. 30, 2022.

PELLETIZER

The present invention relates to a pelletizer with a rotatably drivable cutter head for dividing material strands output from a die plate into pellets, the cutter head being drivingly connected to a drive motor via a drive shaft, and with a feed device for axial adjustment of the cutter head relative to the die plate in the direction of the cutter head axis of rotation.

Such pelletizers are known in various designs, for example for pelletizing plastics, wherein melt strands of polymer material, which are output from nozzle-shaped holes or through-holes of a die-plate, are knocked off by the blades of a cutter head and reduced to pellets, which are swept past the die-plate by the rotating cutter head. The pelletizer can operate wet, whereas in an underwater pelletizer, for example, the cutter head runs in a cutting chamber which is flushed through by process water or a process liquid in order to keep the cut pellets from sticking and caking and to transport them away from the cutting chamber. A water-ring pelletizer also works wet, although the blades do not run in a water bath, but are surrounded on the circumference by an annular stream of water flowing past, which pulls the cut pellets along and transports them away, cooling them in the process to introduce solidification. The rotating blades cut off the dry melt strands output from the die-plate at the front side and eject the still hot, molten pellets into the rotating water ring. As in the case of the underwater pelletizer, water does not necessarily have to be used as the process liquid, although this is possible, but other liquids or mixtures or water with additives can also be used.

On the other hand, such pelletizers can also operate dry, wherein, for example, in case of air or cooling air pelletizers, the hot die-plate is dry, wherein here, too, a rotating blade can sweep along a die-plate in order to knock off the melt strands output from the channel mouths. The pellets, which are knocked off hot, are conveyed onward and cooled by a stream of air, but this takes longer due to the lower thermal conductivity of air compared to water.

The die plate from which the melt strands are output does not necessarily have to be in the form of a flat plate, but can also have a tapered or curved contour, although a plate-shaped die plate is advantageous for many applications. Independently of this, the pelletizers do not necessarily have to granulate plastic melts, but can also reduce other pasty material strands to pellets, for example pasty masses in the food sector or with pharmaceutical active ingredients.

For the pelletizing process, the axial position of the cutter head relative to the die plate is important for several reasons. Typically, the blades should be pressed or clamped against the cutting surface of the die plate with a predetermined setting force so that the blades scrape precisely across the cutting surface. The restoring forces occurring during the cut must be absorbed, which can vary, for example, depending on the setting angle of the blades.

Depending on the application with, for example, different materials to be pelletized, or depending on the use of different cutter heads or blades, it may be necessary to change the axial position and/or the feed forces and adapt them to the respective application or the cutter head used. It also becomes necessary to readjust the cutter head due to wear as the blades wear.

The axial adjustment of the cutter head relative to the die plate in the direction of the axis of rotation can be accomplished in various ways. For example, it is known to use mechanical or hydraulic or pneumatic spring devices to drive the cutter head against the cutting surface of the die plate, wherein, for example, the cutter head can be seated axially-adjustably on the drive shaft via a splined shaft profile or a similar axially adjustable, torque-transmitting connection, and the drive shaft can be hollow, for example to press against the cutter head with a spring-biased motion rod, cf., for example DE 196 47 396 C2 or DE 296 24 638 U1.

On the other hand, it is also known that the axial adjustment of the cutter head can be motor-driven. For example, EP 20 67 591 A1 shows an underwater pelletizer whose drive shaft is mounted in an axially adjustable bearing connected to a rack that can be adjusted by a pinion. The pinion is driven by a pneumatic cylinder via a gear stage. The patent document promises lower fluctuations of the holding torque at standstill from the pneumatic drive, however, quite high efficiency losses occur due to the pneumatic cylinder, in particular when working with high pressures, which are necessary to fix the cutter head sufficiently stiff. In addition, the actuating forces are introduced on one side via the rack and pinion profile, which leads to stresses in the bearing arrangement and results in losses in rigidity and efficiency.

From the patent document EP 12 86 811 B1 there is further known a pelletizer, the cutter head of which can be axially adjusted by means of a servomotor. The servomotor drives a threaded sleeve in rotation via a worm gear stage, the rotational movement of which axially adjusts a threaded spindle that is in screw engagement with it. The axial movement of the threaded spindle is transmitted via a cross bolt to a bearing sleeve in which the drive shaft is mounted axially-fixed, rotatably. Due to the cross bolt, however, the actuating force is only applied selectively and eccentrically to the bearing sleeve of the drive shaft, which also leads to bearing stresses and losses in rigidity as well as efficiency. In addition, the drive train between the servomotor and the bearing sleeve is bulky due to the eccentric, transversely spaced arrangement of the spindle drive stage and the associated worm gear stage, so that the self-locking effect promised by the design of the multiple gear stages comes at a high price.

Furthermore, an underwater pelletizer is known from the patent document EP 24 42 954 B1, which also adjusts the cutter head in a motor-driven manner. The variable displacement motor is located at a transverse distance next to the main drive shaft and drives a spindle drive stage via a belt. The spindle drive stage is located coaxially to the main drive shaft and can axially adjust a motion rod which can act on the cutter head through the hollow main drive shaft. In this case, the motion rod is passed through the main drive motor in order to be able to arrange the spindle drive stage on the rear side of the main drive motor, i.e., on the side facing away from the cutter head, and to connect it to the motion rod. This requires a specially configured main drive motor with a drive shaft bored hollow throughout on both end faces and also leads to an axially very long structure.

On this basis, it is the object of the present invention to provide an improved pelletizer of the type mentioned, which avoids the disadvantages of the prior art and develops the latter in an advantageous manner. In particular, the aim is to achieve rigid and energy-efficient axial adjustment of the cutter head without having to sacrifice a compact design for this purpose or requiring a specially designed main drive.

According to the invention, the task is solved by a pelletizer according to claim 1. Preferred embodiments of the invention are the subject-matter of the dependent claims.

It is therefore proposed to place the spindle drive stage directly on the drive shaft for axial adjustment of the cutter head between the main drive motor and the cutter head, in order to axially adjust the rotating drive shaft itself. This eliminates the need for a motion rod passing through the entire drive train, and the main drive need not be a hollow-shaft motor. According to the invention, the spindle element of the spindle drive stage of the feed device is configured as a spindle sleeve which is axially firmly seated on the rotating drive shaft between the drive motor and the cutter head, wherein the drive shaft is connected to the cutter head in an axially-fixed and rotationally-fixed manner and transmits the axial movement of the spindle sleeve to the cutter head. Unlike in the prior art, the axial positioning movement of the spindle element is not introduced punctually via transverse bolts from an eccentric spindle drive arrangement or transmitted to the cutter head via separate movement rods from the rear of the main drive, but is transmitted directly to the rotatably drivable drive shaft, so that a favorable force flow and thus a high rigidity and energy efficiency of the feed device can be achieved. At the same time, a compact design can be realized that does not need to extend the drive train axially beyond the main drive motor. At the same time, special configurations of the main drive, in particular a hollow-shaft motor, can be dispensed with, although such a motor can of course still be used.

In further embodiments of the invention, the tube nut of the spindle drive stage, which is also seated coaxially above the drive shaft, is rotatably but axially-fixedly mounted, for example, to a housing assembly and/or chassis assembly which may be provided around the drive shaft or adjacent to the drive shaft between the drive motor and the cutter head.

The spindle element, which is designed as a spindle sleeve, can also be mounted on the housing assembly and/or chassis assembly. Independently of this, however, the spindle element is mounted in an axially adjustable but rotationally-fixed manner, so that a rotational movement of the tube nut is converted into an axial movement of the spindle element.

In an advantageous further embodiment of the invention, the spindle element may be held axially-fixed to the drive shaft, but rotatably so that the drive shaft can rotate away under the spindle sleeve, but precisely follow axial movements of the spindle sleeve.

In order to be able to build slim transversely to the axis of rotation, in an advantageous further development of the invention, an axially offset arrangement of the bearing assemblies for the tube nut on the one hand and for the spindle element on the other hand can be provided. In particular, a bearing assembly for rotatably, axially-fixed mounting of the tube nut can be positioned axially offset and/or without overlapping when viewed radially and/or spaced apart from a bearing assembly for axially-fixed, rotatably mounting of the spindle element on the drive shaft. Alternatively or additionally, the bearing assembly for rotatably mounting the tube nut in an axially-fixed manner may also be axially offset and/or positioned without overlapping and/or spaced from a bearing assembly mounting the spindle element in an axially adjustable but rotatably fixed manner, in particular on the housing assembly and/or chassis assembly.

Independently of the offset of the tube nut bearing assembly, the bearings between the spindle element and drive shaft on the one hand and the spindle element and housing assembly and/or a chassis assembly on the other hand can be provided overlapping each other and/or axially approximately at the same position. This makes it possible to achieve radial support of the drive shaft via the spindle sleeve.

The spindle drive stage can basically be configured in different ways to convert the rotational movement of the tube nut into an axial movement of the spindle element. In order to achieve a rigid positioning of the cutter head even at high actuating forces while at the same time maintaining a compact design, the spindle drive stage can, in an advantageous further development of the invention, be configured as a planetary thread drive, with planetary thread rollers being provided between the tube nut and the spindle element for converting the rotational movement of the tube nut into an axial movement of the spindle element.

Alternatively, the spindle drive stage can also be configured as a ball screw drive, wherein balls can be provided between the tube nut and the spindle element instead of the planetary thread rollers specified for converting the rotational movement of the tube nut into an axial movement of the spindle element. Such a ball screw drive enables the tube nut to be configured to be very short and to run very smoothly even at higher adjustment speeds, transmitting no vibrations to the drive shaft.

Alternatively, however, the spindle drive stage can also be configured as a threaded engagement drive, in which case no rolling elements are provided between the tube nut and the spindle element, but instead an internal thread provided on the tube nut meshes directly with an external thread of the spindle element. Thanks to it there is possible a particularly slim configuration of the spindle drive stage.

Independently of the specific design of the spindle drive stage, its tube nut can be driven in rotation by a servomotor, wherein a chain stage or a belt drive stage can be provided between the servomotor and the tube nut, which makes it possible in a simple manner to arrange the servomotor transversely spaced next to the drive shaft or eccentrically to the main drive train, wherein the servomotor can be arranged with its motor shaft parallel to the axis of rotation of the cutter head.

In a further development of the invention, the chain or belt of the chain drive stage or belt drive stage can drive a drive pinion, which can be attached to the end face of the tube nut in a rotationally-fixed manner. The chain or belt thus runs around the drive shaft or the drive shaft to be axially adjusted extends through the belt drive stage. By arranging the drive pinion on the end face of the tube nut, there can be achieved a simple assembly of the spindle drive stage and the belt drive stage. At the same time, the tube nut can be stably supported centrally in the region where the actuating forces are transmitted to the spindle element.

Instead of a chain stage or a belt stage, however, it would also be possible in principle to drive the tube nut via a spur gear stage. By using a chain stage or a belt stage, an efficient drive of the spindle drive stage can be achieved with a slim design and greater freedom in arranging the servomotor, while at the same time running quietly.

Alternatively, or additionally the gear stage between the servomotor and the tube nut can also be contactless and/or comprise a magnetic gear stage and/or a clutch stage. For example, a magnetic gear stage can be provided which, on the one hand, has permanent magnets connected in a rotationally-fixed manner to the tube nut and, on the other hand, has permanent magnets connected to a drum element arranged coaxially thereto. In particular, however, such a magnetic gear stage and/or clutch stage can be configured to operate electrodynamically and transmit the driving motion via eddy currents. Such electrodynamically operating magnetic gear stages and/or clutch stages are known, for example, as retarders or eddy current brakes or are similar in function to an electric motor. The advantages of such a magnetic gear stage lie in particular in the fact that it is wear-free and also provides excellent results in terms of smooth running.

If a chain stage or a belt stage is provided, the servomotor can basically drive a drive pinion directly with its motor shaft, which drives the chain or the belt of the chain stage or belt stage. In an alternative further development of the invention, however, a further gear stage may be provided between the servomotor and the drive pinion for driving the chain or belt, which may be positioned between the servomotor and the drive pinion. In particular, such an additional gear stage between the drive pinion and servomotor can be integrated into the servomotor or a common motor and gearbox housing. Advantageously, the additional gear stage can be arranged coaxially with the servomotor motor axis or have gear input and output shafts, both of which can be arranged coaxially with the servomotor shaft.

In order to be able to stably hold an axial position of the cutter head once it has been moved to by the servomotor and/or a feed force of the cutter head caused by the servomotor, in further development of the invention a securing brake can be provided which can lock or hold fast or fix a relevant part of the adjustment drive train between the spindle drive stage and the servomotor.

For example, the the securing brake can be provided or designed to lock or hold the tube nut of the spindle drive rotationally and/or to lock or hold the spindle element axially in the form of the spindle sleeve. By locking the tube nut and/or the spindle element, a particularly rigid clamping of the cutter head in the position set by the servomotor can be achieved, since yielding or elasticities in the further drive train between tube nut and servomotor are bypassed or no longer play a role.

Alternatively, or additionally, the securing brake can also lock a drive element closer to the servomotor in order to exploit transmission ratios and enable reliable locking of the feed device with smaller holding forces. For example, the drive pinion for driving the chain and/or the belt of the chain stage or belt stage and/or a gear element of the gear stage between the drive pinion and the servomotor and/or the servomotor or servomotor shaft itself can be acted upon and held in place by the securing brake.

Depending on the design of the pelletizer, the bearing of the drive shaft, which is axially adjustable in addition to its main rotational movement, between the spindle drive stage and the cutter head can be of different design, whereby a seal can also be provided as an alternative or in addition to the bearing, in particular if the pelletizer operates wet, for example if it is designed as an underwater pelletizer.

In a further embodiment of the invention, the axially adjustable, rotatably drivable drive shaft may be axially adjustable and rotatably mounted in a cutting chamber housing which bounds a cutting chamber in which the cutter head is received.

Depending on the connection of the cutter head, it does not have to be the drive shaft itself, but in an advantageous further development it can also be a cutter head receptacle which is mounted in the cutting chamber housing in the manner and is connected to the drive shaft in a rotationally and axially-fixed manner.

In particular, a bearing assembly between the cutting chamber housing and the drive shaft or cutter head receptacle can provide radial support for the drive shaft/cutter head receptacle on the cutting chamber housing.

Independently of this, a sealing assembly can be provided between the cutting chamber housing and the drive shaft or the cutter head receptacle for sealing the cutting chamber in the region between the cutting chamber housing and the drive shaft/cutter head receptacle, wherein the sealing assembly, in advantageous further development of the invention, can be designed to permit axial movements and rotational movements of the drive shaft and the cutter head receptacle.

In particular, a guide bushing can be provided between the cutting chamber housing and the cutter head receptacle/drive shaft, on which the cutter head receptacle and/or the drive shaft is radially supported by at least one radial bearing in the form of a rolling bearing and/or a sliding bearing.

The guide bushing is thereby advantageously led in an axially adjustable manner in the cutting chamber housing, in particular by one or more sliding bearings, wherein the guide bushing can at the same time be sealed with respect to the cutting chamber housing by at least one seal. The seal can be in the form of a sealing ring, for example in the form of an elastic O-ring.

In order to also seal between the guide bushing and the cutter head receptacle or drive shaft, a slide ring seal can be provided, which can be mounted on the cutter head receptacle and/or the drive shaft connected to it.

In particular, the cutter head receptacle can be radially mounted and sealed in the guide bushing, and in an advantageous further development of the invention, the cutter head receptacle can be mounted in the guide bushing with two ball bearings or other rolling bearings. For sealing, a slide ring seal can be provided on the cutter head receptacle, which together with a seal receptacle can seal the cutter head receptacle to the guide bushing.

The invention is explained in more detail below with reference to a preferred embodiment and associated drawings. In the drawings show.

Figure 1:
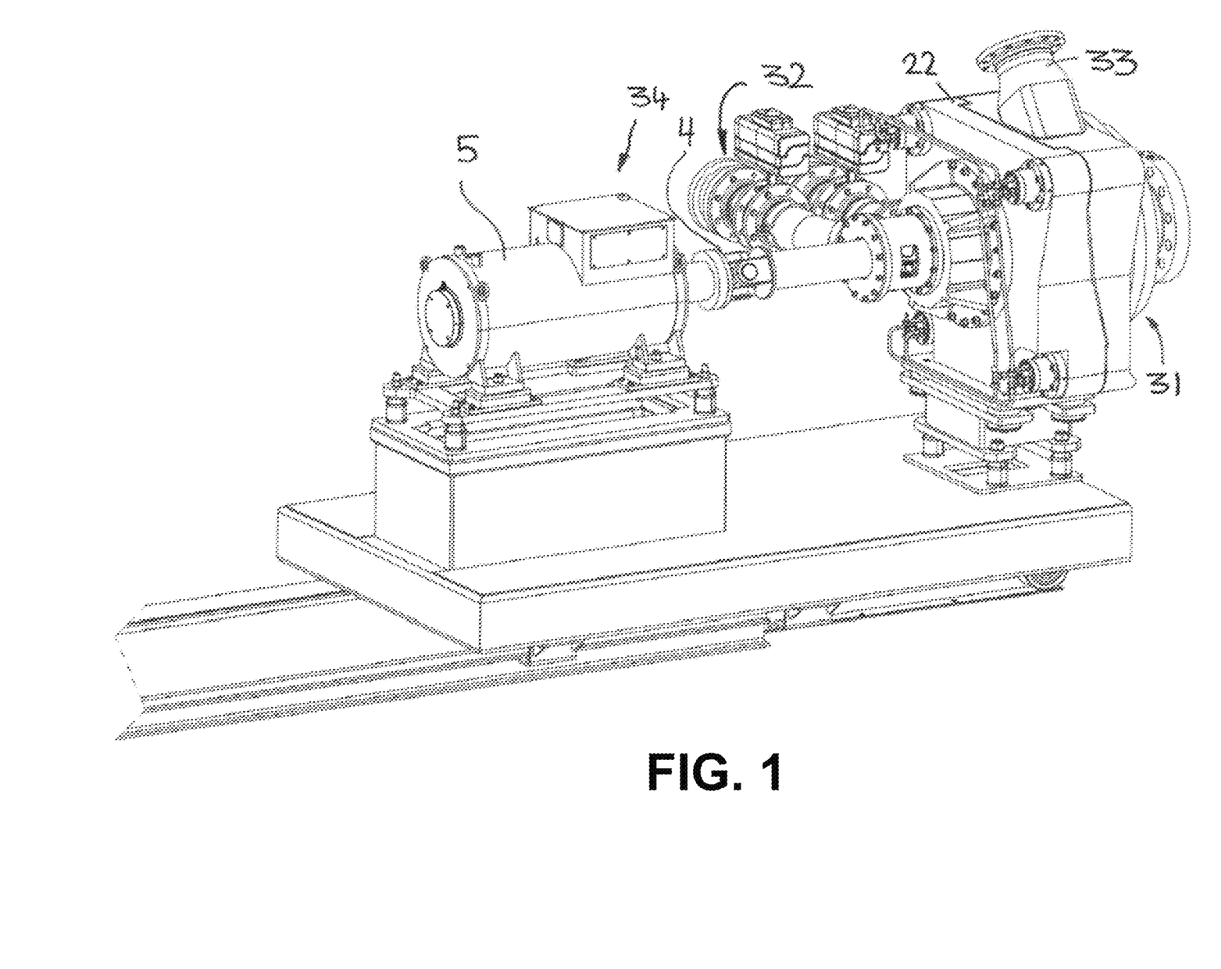
FIG. 1: a perspective view of an underwater pelletizer, showing its cutter head drive device and the process water connections for flushing the cutting chamber.
Figure 4:
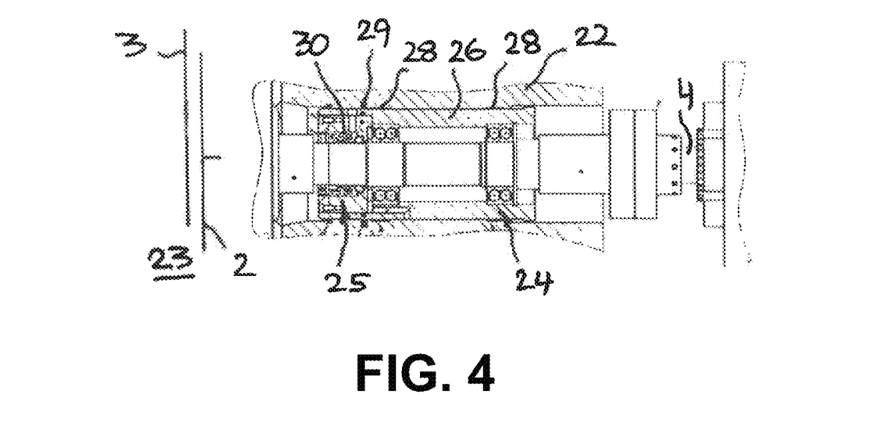
FIG. 4: a longitudinal section through the bearing and seal arrangement of the drive train in the cutting chamber housing of the pelletizer from the preceding figures.

As FIG. 1 shows, the pelletizer 1 may be designed as an underwater pelletizer and comprise a cutting chamber housing 22 in which a cutting chamber 23, cf., FIG. 4, is provided in which a cutter head 2 with blades is accommodated. Via a melt feed head 31, which can be connected to a melt feed device not shown comprising, for example, an extruder, molten plastic material can be fed to a die plate 3 comprising nozzle-like melt channels in order to push melt strands through the die-plate 3 or to allow them to be output from the die plate. The melt channels of the die plate 3 may open onto its end face, which forms a cutting face and faces the cutter head 2 and is arranged in or is adjacent to the cutting chamber 23.

The cutting chamber 23 can be flushed through with process water, which can be fed into the cutting chamber 23 via inlets 32, for example, and discharged together with the pellets in the form of a pellet-process water mixture via outlet 33.

The cutter head 2 may be rotationally driven by a main drive 34 about a cutter head axis of rotation 12, which may extend perpendicular to the die-plate 3, for example. The main drive 34 can comprise a drive motor 5, for example in the form of an electric motor, which rotationally drives the cutter head 2 via a drive shaft 4, cf., FIG. 1.

Figure 2:
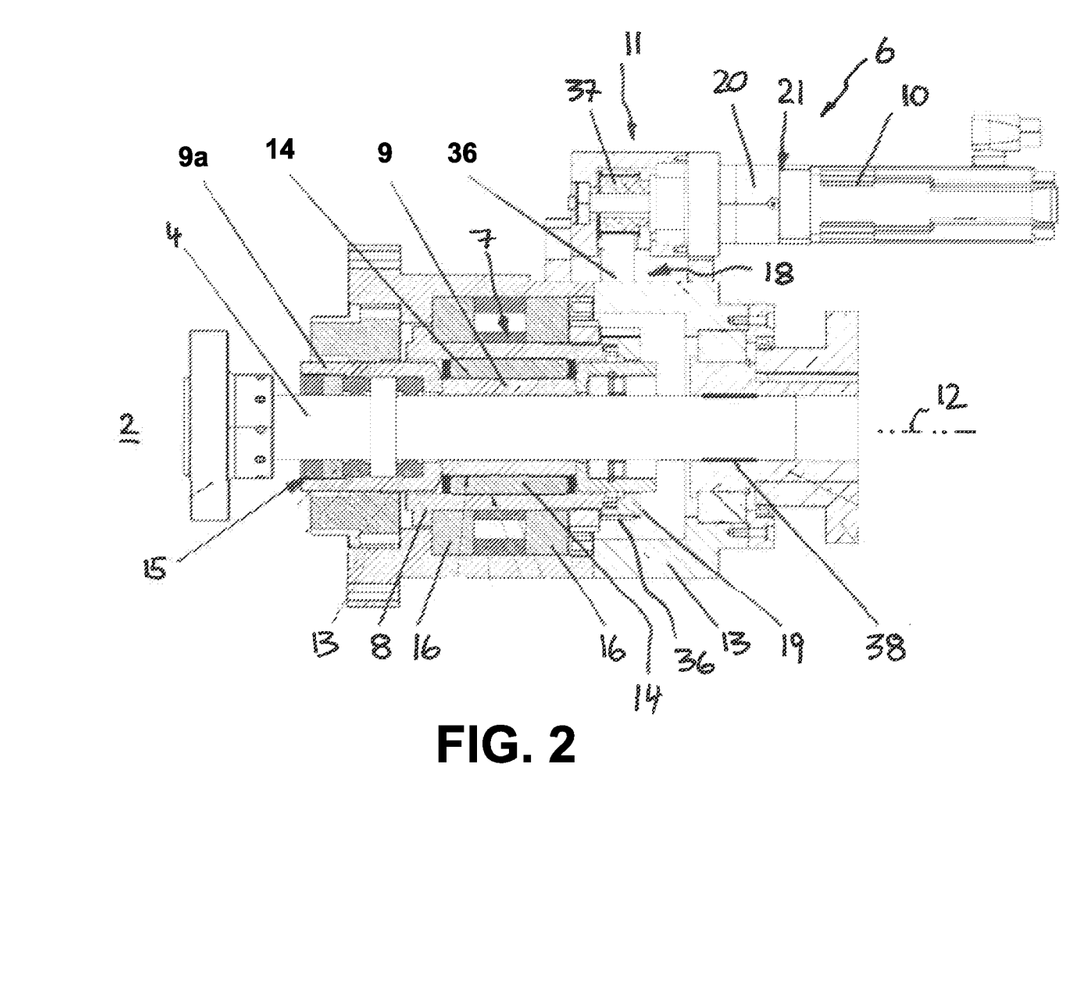
FIG. 2: a longitudinal section through the drive train for rotationally driving the cutter head of the pelletizer of FIG. 1, showing the feed device for axial adjustment of the cutter head, wherein the spindle drive stage nested on the rotating drive shaft is configured as a planetary thread drive.
Figure 3:
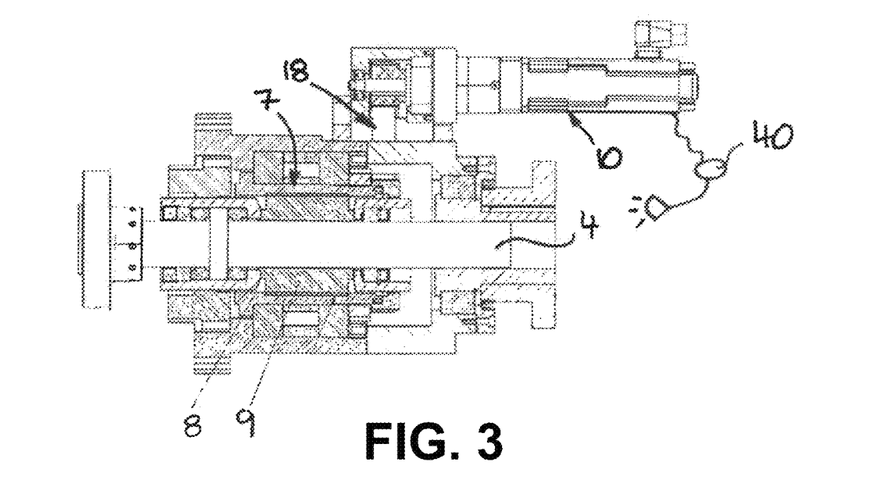
FIG. 3: a longitudinal section through the drive train similar to FIG. 2, wherein the spindle drive stage of the feed device for axial adjustment of the cutter head is configured as a screw thread drive.

In addition to the main drive 34, a feed device 6 comprising a servomotor 10 is provided for axial adjustment of the cutter head 2 relative to the die plate 3, cf., FIGS. 2 and 3.

The feed device 6 comprises a spindle drive stage 7 which is seated between the drive motor 5 and the cutter head 2 on the drive shaft 4 in order to be able to axially adjust the rotatably drivable drive shaft 4 itself. The drive shaft 4 is connected to the cutter head 2 in a rotationally and axially-fixed manner, so that the axial adjusting movement of the drive shaft 4 leads to an advance of the cutter head 2 in the axial direction.

The spindle drive stage 7 comprises a tube nut 8 and a spindle element 9 seated in the tube nut 8. The spindle element 9 is configured as a spindle sleeve which is seated on the drive shaft 4, cf., FIG. 2.

As shown in FIG. 2, the spindle drive stage 7 can be configured as a planetary thread drive, with planets in the form of planetary thread rollers being provided between the tube nut 8 and the spindle element 9, which convert a rotational movement of the tube nut 8 into an axial movement of the spindle element 9.

As FIG. 3 shows, however, the spindle drive stage 7 can also be configured as a screw thread drive in which no planets are provided between the tube nut 8 and the spindle element 9, but instead an internal thread of the tube nut 8 is in screw engagement with an external thread of the spindle element 9.

As shown in FIGS. 2 and 3, the tube nut 8 may be rotatably but axially-fixedly mounted to a housing assembly and/or a chassis assembly 13, for example by means of a bearing assembly 16 between the tube nut 8 and the housing assembly and/or the chassis assembly 13, the bearing assembly 16 may comprise one or more rolling bearings, for example in the form of a tapered roller bearing pair or a radial/axial bearing pair. If necessary, however, sliding bearings for rotatably and axially-fixed mounting of the tube nut 8 are also possible.

The spindle element 9 is mounted on the drive shaft 4 on the one hand, whereby a bearing 15 provided for this purpose can be designed to be axially-fixed but rotatable, so that axial movements of the spindle element 9 are transmitted directly to the drive shaft 4, but the latter can rotate in the spindle sleeve 9. The axially-fixed rotatably mounted bearing assembly 15 between the drive shaft 4 and the spindle element 9 may include, for example, two rolling bearings and/or sliding bearings which may be arranged on opposite sides of a shaft projection 35, the rolling bearings used being, for example, tapered roller bearings and/or ball bearings and/or cylindrical bearings.

The axially-fixed bearing assembly 15 between drive shaft 4 and spindle element 9 may be arranged outside tube nut 8 or axially offset from bearing assembly 16 for tube nut 8, cf., FIGS. 2 and 3.

The spindle element 9 is radially supported between the drive shaft 4 and the tube nut 8 or, if applicable, the intermediate planet 14. In order to hold the spindle element 9 in a rotationally-fixed but axially adjustable manner, a further bearing assembly 17 can be provided between the spindle element 9 and the housing assembly and/or the chassis assembly 13, which is configured to be axially adjustable but rotationally-fixed. This can be, for example, a splined shaft profile or a pin guide on an extension section of the spindle element 9.

A servomotor 10 is provided for rotationally driving the tube nut 8 of the spindle drive stage 7, which can be arranged with its motor shaft aligned parallel to the axis of rotation 13 of the cutter head 2 or the drive shaft 4 and transversely offset next to the drive shaft 4, cf., FIGS. 2 and 3.

In order to bridge the transverse offset between the servomotor 10 and the tube nut 8, a belt stage 18 can be provided, the belt 36 of which can drive a drive pinion 19, which can be mounted on an end face of the tube nut 8 and connected thereto in a rotationally-fixed manner. The drive pinion 19 is configured as a ring gear through which the drive shaft 4 passes.

On the other hand, the belt 36 of belt stage 18 is driven by a drive pinion 37 which can be driven in rotation from servomotor 10.

Advantageously, a further gear stage 20 can be provided between the servomotor 10 and the drive pinion 37, which can be arranged with its gear input and output shafts coaxial to the motor shaft of the servomotor 10 and in particular can be integrated in a common motor/gear housing, cf., FIG. 2.

For axial adjustment of the cutter head 2, there results the following force flow: The servomotor 10 drives the belt stage 18 via the gear stage 20 and its drive belt 36 via the drive pinion 19. The rotational movement of the axially-fixed tube nut 8 is converted into an axial movement of the spindle element 9 via the planet 14 according to FIG. 2 or the screw thread engagement according to FIG. 3. The axial movement of the spindle element 9, which is axially-fixed on the drive shaft 4, is transmitted to the drive shaft 4, which in turn is coupled to the cutter head 2 in a rotationally and axially-fixed manner, so that the cutter head 2 can be moved towards or away from the plate 3.

The rotational driving motion from the drive motor 5 can be transmitted to the drive shaft 4 by a coupling 38, which is configured to be rotationally-fixed but axially movable and can comprise, for example, a splined shaft profile 38 or a toothed profile or the like.

As FIG. 4 shows, the drive train can be sealed towards the cutting chamber 23 or radially supported or mounted in the cutting chamber housing 22.

Depending on the design of the pelletizer 1, the bearing arrangement of the drive shaft 4, which is axially adjustable in addition to its main rotational movement, between the spindle drive stage 7 and the cutter head 2 can be of different design, wherein a seal can also be provided in addition to the bearing arrangement, in particular if the pelletizer 1 operates wet, for example is designed as an underwater pelletizer.

In this case, the axially adjustable, rotatably drivable drive shaft 4 can itself be mounted axially displaceably and rotatably in the cutting chamber housing 22, which bounds the cutting chamber 23.

Depending on the connection of the cutter head, it does not have to be the drive shaft 4 itself, but in advantageous further development it can also be a cutter head receptacle which is mounted and sealed in the cutting chamber housing 22 in the manner and is connected to the drive shaft 4 in a rotationally and axially-fixed manner.

In particular, a bearing assembly 24 between the cutting chamber housing 22 and the drive shaft or cutter head receptacle can provide radial support for the drive shaft/cutter head receptacle on the cutting chamber housing 22.

Independently thereof, a sealing assembly 29, 30 can be provided between the cutting chamber housing 22 and the drive shaft/cutter head receptacle for sealing the cutting chamber 23 in the region between the cutting chamber housing 22 and the drive shaft/cutter head receptacle, wherein the sealing assembly 29, 30 allows axial movement and rotational movement of the drive shaft and cutter head receptacle.

In particular, a guide bushing 26 can be provided between the cutting chamber housing 22 and the cutter head receptacle/drive shaft, on which the cutter head receptacle and/or the drive shaft is radially supported by at least one radial bearing 24 in the form of a rolling bearing and/or a sliding bearings, cf., FIG. 4.

The guide bushing 26 is thereby axially displaceably led in the cutting chamber housing 22, in particular by one or more sliding bearings 28, wherein the guide bushing 26 can at the same time be sealed with respect to the cutting chamber housing by at least one seal 29, cf., FIG. 4. The seal 29 can be in the form of a sealing ring, for example in the form of an elastic O-ring.

In order to also seal between the guide bushing 26 and the cutter head receptacle or a drive shaft, a slide ring seal 30 can be provided, which can be mounted on the cutter head receptacle and/or the drive shaft connected to it.

In particular, the cutter head receptacle can be radially mounted and sealed in the guide bushing 26, and in an advantageous further development of the invention, the cutter head receptacle can be mounted in the guide bushing 26 with two ball bearings or other rolling bearings. For sealing, a slide ring seal 30 can be provided on the cutter head receptacle, which together with a seal receptacle can seal the cutter head receptacle to the guide bushing 26.

As can be seen from the above, the pelletizer 1 is characterized in particular by the following features and properties:

The assembly described allows a shaft 4 driven by an external motor 5 to be axially displaced.

The assembly allows a tensile or compressive force to be applied to a shaft 4 driven by an external motor 5.

The assembly allows a sliding shaft 4 to be held in position and to receive external tensile or compressive force.

By regulating the rotational torque of the servomotor 10, the feed force can be adjusted continuously in both travel directions and independently of each other.

By regulating the speed of the servomotor 10, the travel speed can be adjusted continuously in both directions and independently of each other.

A securing brake 21 can be used to hold the position of the motion rod in place even when external forces are applied.

With the help of an integrated, absolute encoder, the position of the motion rod can be measured and monitored during operation.

By means of a suitable, in particular electronic, control device 40, automatic process sequences can be programmed, which can, for example, facilitate maintenance work and the operation of the installation, such as:
automatic adjustment of the cutter head position;
adaptation of the blade travel to the current wear height of the cutting surface;
measurement of die plate wear/cutter wear;
recipe-dependent feed forces;
coupling and uncoupling of the cutting chamber without feed forces of the cutter head;
There are possible different operation settings:
manual movement of the blades;
feed via torque from the main motor;
feed via torque from the servomotor (=feed force specification);
feed in travel per time.

Standard motors can be used for the main drive, wherein there can be provided simple control of position and feed force.

The invention claimed is:

1. A pelletizer with comprising:
a rotatably drivable cutter head drivingly connected to a drive motor via a drive shaft;
a feed device for axial adjustment of the cutter head relative to a die plate in a direction of a cutter head axis of rotation, the feed device comprising:
a spindle drive stage comprising a tube nut and a spindle element operatively connected to the tubular nut in a geared manner;
a servomotor; and
a gear stage between the servomotor and the tube nut;
wherein the tube nut is rotatably adjustable by the servomotor via the gear stage, so that the spindle element, is axially adjustable
wherein the spindle element is configured as a spindle sleeve, which is mounted onto the rotating drive shaft in an axially-fixed manner between the drive motor and the cutter head; and
wherein the drive shaft:
is connected to the cutter head in an axially-fixed and rotationally-fixed manner; and
transmits the axial movement of the spindle sleeve to the cutter head.

2. The pelletizer according to claim 1, wherein the tube nut is rotatably but axially-fixedly mounted on a housing assembly and/or chassis assembly;
wherein the spindle element is axially-adjustably but in a rotational-fixed manner mounted on the housing assembly and/or chassis assembly; and
wherein the drive shaft is axially-fixedly but rotatably held on the spindle element.

3. The pelletizer according to claim 1, wherein a first bearing assembly for rotatable, axially-fixed mounting of the tube nut is axially spaced in the direction of the cutter head axis of rotation from a second bearing assembly for axially-fixed, rotatable mounting of the spindle element on the drive shaft and/or from a third bearing assembly for axially-adjustably mounting of the spindle element in a rotationally-fixed manner.

4. The pelletizer according to claim 1, wherein the spindle drive stage is configured as a planetary thread drive, wherein planetary thread rolls are provided between the tube nut and the spindle element for converting a rotational movement of the tube nut into an axial movement of the spindle element.

5. The pelletizer according to claim 1, wherein the spindle drive stage is configured as a ball screw drive, wherein balls are provided between the tube nut and the spindle element for converting a rotational movement of the tube nut into an axial movement of the spindle element.

6. The pelletizer according to claim 1, wherein the spindle drive stage is configured as a threaded engagement drive, wherein an internal thread provided on the tube nut meshes with an external thread of the spindle element.

7. The pelletizer according to claim 1, wherein the gear stage comprises a chain stage or a belt stage.

8. The pelletizer according to claim 7, wherein the chain stage or a belt stage has a drive pinion connected to the tube nut at an end face of the tube nut in a rotationally-fixed manner.

9. The pelletizer according to claim 7, wherein an additional gear stage is provided between the chain stage or a belt stage and the servomotor.

10. The pelletizer according to claim 1, wherein the gear stage comprises a contactlessly operating magnetic gear stage and/or a clutch stage for transmitting rotational torque and driving motion from the servomotor to the tube nut.

11. The pelletizer according to claim 10, wherein the magnetic gear stage and/or the clutch stage is configured to be electrodynamic, operating with eddy currents.

12. The pelletizer according to claim 1, wherein the servomotor is arranged transversely offset from the drive shaft and/or is aligned with its a servomotor shaft parallel to the drive shaft.

13. The pelletizer according to claim 1, wherein a securing brake is provided for rotationally locking the tube nut and/or for axially locking the spindle element.

14. The pelletizer according to claim 13, wherein the securing brake is configured to lock the servomotor.

15. The pelletizer according to claim 1, wherein the axially-adjustably, rotationally drivable drive shaft and/or a cutter head receptacle connected thereto is axially displaceably, rotatably mounted in a cutting chamber housing that bounds a cutting chamber in which the cutter head is received.

16. The pelletizer according to claim 15, wherein a fourth bearing assembly between the cutting chamber housing and the cutter head receptacle and/or the drive shaft provides radial support of the cutter head receptacle and/or the drive shaft on the cutting chamber housing.

17. The pelletizer according to claim 15, wherein a sealing assembly is provided between the cutter head receptacle and/or drive shaft and the cutting chamber housing for sealing the cutting chamber in the region between the cutter head receptacle and/or drive shaft and the cutting chamber housing; and
　　wherein the sealing assembly is configured to allow axial movements and rotational movements of the cutter head receptacle and/or drive shaft.

18. The pelletizer according to claim 15, wherein a guide bushing is provided between the cutting chamber housing and the cutter head receptacle and/or drive shaft;
　　wherein the cutter head receptacle and/or drive shaft is radially supported on the guide bushing by at least one radial bearing in the form of a rolling bearing and/or a sliding bearing;
　　wherein the guide bushing is:
　　　　guided axially-adjustably in the cutting chamber housing;
　　　　mounted axially-adjustably by sliding bearings; and
　　　　sealed with respect to the cutting chamber housing by at least one seal.

19. The pelletizer according to claim 18, wherein a slide ring seal is provided between the guide bushing and the cutter head receptacle and/or the drive shaft.

20. The pelletizer according to claim 19, wherein the slide ring seal is mounted on the cutter head receptacle which is connected to the drive shaft in a rotationally-fixed manner.

21. The pelletizer according to claim 1, wherein the feed device further comprises a control device for controlling the servomotor in dependence on at least one process parameter and/or one system parameter.

22. The pelletizer according to claim 21, wherein the control device has an automatic mode in which the position of the cutter head relative to the die plate is automatically adjusted in dependence on the at least one process parameter and/or one system parameter.

23. The pelletizer according to claim 18, wherein a detection device is provided for detecting signs of wear on the cutter head and/or on the die plate;
　　wherein the control device is configured to control the servomotor for adapting the cutter head position to the detected signs of wear in dependence on a signal from the wear detection device.

24. The pelletizer according to claim 21, wherein the control device has setting means for setting a feed force of the cutter head against the die plate;
　　wherein the setting means having an automatic mode in which, in dependence of a manually input and/or sensor-sensed recipe signal characterizing a recipe of material to be pelletized, the servomotor is controlled to set the feed force matching the recipe.

25. The pelletizer according to claim 21, wherein the control device is configured to automatically control the feeding of the cutter head by driving the servomotor in dependence of at least one parameter selected from the group consisting of a rotational torque of the drive motor, a rotational torque of the servomotor, an infeed speed an infeed in travel/time, and a combination thereof.

* * * * *